(12) United States Patent
Potter

(10) Patent No.: US 7,195,393 B2
(45) Date of Patent: Mar. 27, 2007

(54) MICRO FLUIDIC VALVES, AGITATORS, AND PUMPS AND METHODS THEREOF

(75) Inventor: Michael D. Potter, Churchville, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 10/160,750

(22) Filed: May 31, 2002

(65) Prior Publication Data
US 2002/0182091 A1 Dec. 5, 2002

Related U.S. Application Data

(60) Provisional application No. 60/294,912, filed on May 31, 2001.

(51) Int. Cl.
B01F 11/00 (2006.01)
B01F 13/00 (2006.01)
F16K 31/02 (2006.01)
F16K 15/16 (2006.01)
F04B 19/00 (2006.01)

(52) U.S. Cl. .................. 366/114; 366/118; 366/127; 366/275; 251/129.01; 251/331; 417/48; 417/436

(58) Field of Classification Search ................ 251/129.01–129.06, 331; 417/48, 436; 366/118, 366/127, 261, 275, 273, 349, 114, 113
See application file for complete search history.

(56) References Cited

U.S. PATENT DOCUMENTS 2,567,373 A 9/1951 Giacoletto et al.
2,588,513 A 3/1952 Giacoletto (Continued)

FOREIGN PATENT DOCUMENTS

JP 58-029379 A 2/1983

(Continued)

OTHER PUBLICATIONS

"Microflow Devices and Systems", Shuchi Shoji and Masayoshi Esashi, J. Micromech. Micro eng. 4 (1994) 157-171, 1994 IOP Publishing Ltd.*

(Continued)

Primary Examiner—Tony G. Soohoo
(74) Attorney, Agent, or Firm—Nixon Peabody LLP

(57) ABSTRACT

A valve which has a structure with at least one opening and a member which has a fixed static charge and also has a first position exposing the opening and a second position sealing the opening. A method for making the valve includes providing a structure with at least one opening and providing a member having a fixed static charge where the member has a first position exposing the opening and a second position sealing the opening. An agitator includes a base with at least one trench, a structure with at least one opening, and a membrane with a fixed static charge. The structure is connected to the base over the trench with the opening in the structure extending through to the trench in the base. The membrane is connected to the base across at least a portion of the trench. A pump includes a base with at least one trench, a structure with at least two openings, a membrane with a fixed static charge, a first cantilever arm having a fixed static charge, and a second cantilever arm having a fixed static charge. The structure is connected to the base over the trench with the openings in the structure extending through to the trench in the base. The membrane is connected to the base across at least a portion of the trench. The first cantilever arm has a first position exposing one of the openings and a second position sealing the one of the openings. The second cantilever arm has a first position exposing another one of the openings and a second position sealing the another one of the openings.

21 Claims, 7 Drawing Sheets

U.S. PATENT DOCUMENTS

| | | | |
|---|---|---|---|
| 2,978,066 A | 4/1961 | Nodolf | |
| 3,118,022 A * | 1/1964 | Sessler et al. | 381/191 |
| 3,397,278 A | 8/1968 | Pomerantz | |
| 3,405,334 A | 10/1968 | Jewett et al. | |
| 3,487,610 A | 1/1970 | Brown et al. | |
| 3,715,500 A | 2/1973 | Sessler et al. | |
| 3,731,163 A | 5/1973 | Shuskus | |
| 3,742,767 A | 7/1973 | Bernard et al. | |
| 3,786,495 A | 1/1974 | Spence | |
| 3,858,307 A | 1/1975 | Yoshimura et al. | |
| 3,924,324 A | 12/1975 | Kodera | |
| 4,047,214 A | 9/1977 | Francombe et al. | |
| 4,102,202 A | 7/1978 | Ferriss | |
| 4,115,914 A | 9/1978 | Harari | |
| 4,126,822 A | 11/1978 | Wahlstrom | |
| 4,160,882 A | 7/1979 | Driver | |
| 4,166,729 A | 9/1979 | Thompson et al. | |
| 4,285,714 A | 8/1981 | Kirkpatrick | |
| 4,288,735 A | 9/1981 | Crites | |
| 4,375,718 A | 3/1983 | Wadsworth et al. | |
| 4,490,772 A | 12/1984 | Blickstein | |
| 4,504,550 A | 3/1985 | Pook | |
| 4,513,049 A * | 4/1985 | Yamasaki et al. | 428/194 |
| 4,581,624 A * | 4/1986 | O'Connor | 251/129.06 |
| 4,585,209 A * | 4/1986 | Aine et al. | 251/129.02 |
| 4,626,263 A | 12/1986 | Inoue et al. | |
| 4,626,729 A | 12/1986 | Lewiner et al. | |
| 4,701,640 A | 10/1987 | Flygstad et al. | |
| 4,716,331 A | 12/1987 | Higgins, Jr. | |
| 4,736,629 A | 4/1988 | Cole | |
| 4,789,504 A | 12/1988 | Ohmori et al. | |
| 4,789,803 A | 12/1988 | Jacobsen et al. | |
| 4,794,370 A * | 12/1988 | Simpson et al. | 340/825 |
| 4,874,659 A | 10/1989 | Ando et al. | |
| 4,905,701 A | 3/1990 | Cornelius | |
| 4,922,756 A | 5/1990 | Henrion | |
| 4,944,854 A | 7/1990 | Felton et al. | |
| 4,945,068 A | 7/1990 | Sugaya | |
| 4,958,317 A | 9/1990 | Terada et al. | |
| 4,996,627 A | 2/1991 | Zias et al. | |
| 4,997,521 A * | 3/1991 | Howe et al. | 216/17 |
| 5,020,030 A | 5/1991 | Huber | |
| 5,050,435 A | 9/1991 | Pinson | |
| 5,051,643 A | 9/1991 | Dworsky et al. | |
| 5,054,081 A | 10/1991 | West | |
| 5,057,710 A | 10/1991 | Nishiura et al. | |
| 5,081,513 A | 1/1992 | Jackson et al. | |
| 5,082,242 A * | 1/1992 | Bonne et al. | 251/129.01 |
| 5,088,326 A | 2/1992 | Wada et al. | |
| 5,092,174 A | 3/1992 | Reidemeister et al. | |
| 5,095,752 A | 3/1992 | Suzuki et al. | |
| 5,096,388 A | 3/1992 | Weinberg | |
| 5,108,470 A | 4/1992 | Pick | |
| 5,112,677 A | 5/1992 | Tani et al. | |
| 5,118,942 A | 6/1992 | Hamade | |
| 5,129,794 A | 7/1992 | Beatty | |
| 5,132,934 A | 7/1992 | Quate et al. | |
| 5,143,854 A | 9/1992 | Pirrung et al. | |
| 5,156,810 A | 10/1992 | Ribi | |
| 5,164,319 A | 11/1992 | Hafeman et al. | |
| 5,180,623 A * | 1/1993 | Ohnstein | 251/129.01 |
| 5,189,641 A | 2/1993 | Arakawa | |
| 5,207,103 A | 5/1993 | Wise et al. | |
| 5,228,373 A | 7/1993 | Welsch | |
| 5,231,045 A | 7/1993 | Miura et al. | |
| 5,238,223 A * | 8/1993 | Mettner et al. | 251/129.06 |
| 5,256,176 A | 10/1993 | Matsuura et al. | |
| 5,262,000 A | 11/1993 | Welbourn et al. | |
| 5,284,179 A * | 2/1994 | Shikida et al. | 251/129.01 |
| 5,284,692 A | 2/1994 | Bell | |
| 5,323,999 A * | 6/1994 | Bonne et al. | 251/129.06 |
| 5,334,238 A | 8/1994 | Goodson et al. | |
| 5,336,062 A | 8/1994 | Richter | |
| 5,348,571 A | 9/1994 | Weber | |
| 5,349,492 A | 9/1994 | Kimura et al. | |
| 5,355,577 A | 10/1994 | Cohn | |
| 5,365,790 A | 11/1994 | Chen et al. | |
| 5,367,429 A | 11/1994 | Tsuchitani et al. | |
| 5,380,396 A * | 1/1995 | Shikida et al. | 251/129.01 |
| 5,392,650 A | 2/1995 | O'Brien et al. | |
| 5,417,235 A * | 5/1995 | Wise et al. | 251/129.01 |
| 5,417,312 A | 5/1995 | Tsuchitani et al. | |
| 5,419,953 A | 5/1995 | Chapman | |
| 5,441,597 A | 8/1995 | Bonne et al. | |
| 5,445,008 A | 8/1995 | Wachter et al. | |
| 5,474,599 A | 12/1995 | Cheney et al. | |
| 5,488,864 A | 2/1996 | Stephan | |
| 5,491,604 A | 2/1996 | Nguyen et al. | |
| 5,496,507 A | 3/1996 | Angadjivand et al. | |
| 5,512,882 A | 4/1996 | Stetter et al. | |
| 5,519,240 A | 5/1996 | Suzuki | |
| 5,520,522 A | 5/1996 | Rathore et al. | |
| 5,526,172 A | 6/1996 | Kanack | |
| 5,567,336 A | 10/1996 | Tatah | |
| 5,578,976 A | 11/1996 | Yao | |
| 5,591,679 A | 1/1997 | Jakobsen et al. | |
| 5,593,476 A | 1/1997 | Coppom | |
| 5,593,479 A | 1/1997 | Frey et al. | |
| 5,596,194 A | 1/1997 | Kubena et al. | |
| 5,616,844 A | 4/1997 | Suzuki et al. | |
| 5,635,739 A | 6/1997 | Grieff et al. | |
| 5,640,133 A | 6/1997 | MacDonald et al. | |
| 5,668,303 A | 9/1997 | Giesler et al. | |
| 5,671,905 A * | 9/1997 | Hopkins, Jr. | 251/129.01 |
| 5,677,617 A | 10/1997 | Tokai et al. | |
| 5,698,771 A | 12/1997 | Shields et al. | |
| 5,739,834 A | 4/1998 | Okabe et al. | |
| 5,747,692 A | 5/1998 | Jacobsen et al. | |
| 5,771,148 A | 6/1998 | Davis | |
| 5,777,977 A | 7/1998 | Fujiwara et al. | |
| 5,788,468 A | 8/1998 | Dewa et al. | |
| 5,793,485 A | 8/1998 | Gourley | |
| 5,798,146 A | 8/1998 | Murokh et al. | |
| 5,807,425 A | 9/1998 | Gibbs | |
| 5,812,163 A * | 9/1998 | Wong | 347/68 |
| 5,839,062 A | 11/1998 | Nguyen et al. | |
| 5,846,302 A | 12/1998 | Putro | |
| 5,846,708 A | 12/1998 | Hollis et al. | |
| 5,871,567 A | 2/1999 | Covington et al. | |
| 5,874,675 A | 2/1999 | Edmans et al. | |
| 5,897,097 A * | 4/1999 | Biegelsen et al. | 251/129.01 |
| 5,908,603 A | 6/1999 | Tsai et al. | |
| 5,914,553 A | 6/1999 | Adams et al. | |
| 5,919,364 A | 7/1999 | Lebouitz et al. | |
| 5,920,011 A | 7/1999 | Hulsing, II | |
| 5,941,501 A | 8/1999 | Biegelsen et al. | |
| 5,955,932 A | 9/1999 | Nguyen et al. | |
| 5,959,516 A | 9/1999 | Chang et al. | |
| 5,967,163 A | 10/1999 | Pan et al. | |
| 5,969,250 A | 10/1999 | Greiff | |
| 5,971,355 A * | 10/1999 | Biegelsen et al. | 251/129.06 |
| 5,993,520 A | 11/1999 | Yu | |
| 5,994,982 A | 11/1999 | Kintis et al. | |
| 6,007,309 A * | 12/1999 | Hartley | 417/322 |
| 6,016,092 A | 1/2000 | Qiu et al. | |
| 6,032,923 A * | 3/2000 | Biegelsen et al. | 251/129.01 |
| 6,033,852 A | 3/2000 | Andle et al. | |
| 6,037,797 A | 3/2000 | Lagowski et al. | |
| 6,040,611 A | 3/2000 | De Los Santos et al. | |
| 6,043,727 A | 3/2000 | Warneke et al. | |
| 6,046,659 A | 4/2000 | Loo et al. | |
| 6,048,692 A | 4/2000 | Maracas et al. | |
| 6,051,853 A | 4/2000 | Shimada et al. | |
| 6,057,520 A | 5/2000 | Goodwin-Johansson | |

| | | | |
|---|---|---|---|
| 6,069,540 A | 5/2000 | Berenz et al. | |
| 6,089,534 A * | 7/2000 | Biegelsen et al. | 251/129.01 |
| 6,094,102 A | 7/2000 | Chang et al. | |
| 6,100,477 A | 8/2000 | Randall et al. | |
| 6,106,245 A | 8/2000 | Cabuz | |
| 6,119,691 A | 9/2000 | Angadjivand et al. | |
| 6,120,002 A * | 9/2000 | Biegelsen et al. | 251/129.01 |
| 6,123,316 A * | 9/2000 | Biegelsen et al. | 251/129.01 |
| 6,124,632 A | 9/2000 | Lo et al. | |
| 6,126,140 A * | 10/2000 | Johnson et al. | 251/129.01 |
| 6,127,744 A | 10/2000 | Streeter et al. | |
| 6,127,812 A | 10/2000 | Ghezzo et al. | |
| 6,149,190 A | 11/2000 | Galvin et al. | |
| 6,168,395 B1 * | 1/2001 | Quenzer et al. | 417/413.3 |
| 6,168,948 B1 | 1/2001 | Anderson et al. | |
| 6,170,332 B1 | 1/2001 | MacDonald et al. | |
| 6,177,351 B1 | 1/2001 | Beratan et al. | |
| 6,181,009 B1 | 1/2001 | Takahashi et al. | |
| 6,197,139 B1 | 3/2001 | Ju et al. | |
| 6,199,874 B1 | 3/2001 | Galvin et al. | |
| 6,204,737 B1 | 3/2001 | Ellä | |
| 6,214,094 B1 | 4/2001 | Rousseau et al. | |
| 6,238,946 B1 | 5/2001 | Ziegler | |
| 6,255,758 B1 | 7/2001 | Cabuz et al. | |
| 6,265,758 B1 | 7/2001 | Takahashi | |
| 6,275,122 B1 | 8/2001 | Speidell et al. | |
| 6,287,776 B1 | 9/2001 | Hefti | |
| 6,324,914 B1 | 12/2001 | Xue et al. | |
| 6,336,353 B2 | 1/2002 | Matsiev et al. | |
| 6,384,353 B1 | 5/2002 | Huang et al. | |
| 6,393,895 B1 | 5/2002 | Matsiev et al. | |
| 6,395,638 B1 * | 5/2002 | Linnemann et al. | 438/706 |
| 6,423,148 B1 | 7/2002 | Aoki | |
| 6,431,212 B1 * | 8/2002 | Hayenga et al. | 137/855 |
| 6,469,785 B1 | 10/2002 | Duveneck et al. | |
| 6,470,754 B1 | 10/2002 | Gianchandani | |
| 6,485,273 B1 * | 11/2002 | Goodwin-Johansson | 417/410.2 |
| 6,496,348 B2 | 12/2002 | McIntosh | |
| 6,504,118 B2 | 1/2003 | Hyman et al. | |
| 6,580,280 B2 | 6/2003 | Nakae et al. | |
| 6,597,560 B2 | 7/2003 | Potter | |
| 6,626,417 B2 * | 9/2003 | Winger et al. | 251/129.01 |
| 6,638,627 B2 | 10/2003 | Potter | |
| 6,673,677 B2 | 1/2004 | Hofmann et al. | |
| 6,674,132 B2 | 1/2004 | Willer | |
| 6,688,179 B2 | 2/2004 | Potter et al. | |
| 6,707,355 B1 * | 3/2004 | Yee | 335/78 |
| 6,717,488 B2 | 4/2004 | Potter | |
| 6,734,770 B2 | 5/2004 | Aigner et al. | |
| 6,750,590 B2 | 6/2004 | Potter | |
| 6,773,488 B2 | 8/2004 | Potter | |
| 6,787,438 B1 * | 9/2004 | Nelson | 438/584 |
| 6,798,132 B2 | 9/2004 | Satake | |
| 6,841,917 B2 | 1/2005 | Potter | |
| 6,842,009 B2 | 1/2005 | Potter | |
| 6,854,330 B2 | 2/2005 | Potter | |
| 2001/0047689 A1 | 12/2001 | McIntosh | |
| 2002/0000649 A1 | 1/2002 | Tilmans et al. | |
| 2002/0012937 A1 | 1/2002 | Tender et al. | |
| 2002/0072201 A1 | 6/2002 | Potter | |
| 2002/0131228 A1 | 9/2002 | Potter | |
| 2002/0131230 A1 | 9/2002 | Potter | |
| 2002/0185003 A1 | 12/2002 | Potter | |
| 2002/0187618 A1 * | 12/2002 | Potter | 438/455 |
| 2002/0197761 A1 | 12/2002 | Patel et al. | |
| 2003/0079543 A1 | 5/2003 | Potter | |
| 2003/0079548 A1 | 5/2003 | Potter et al. | |
| 2003/0080839 A1 | 5/2003 | Wong | |
| 2003/0081397 A1 | 5/2003 | Potter | |
| 2003/0112096 A1 | 6/2003 | Potter | |
| 2003/0201784 A1 | 10/2003 | Potter | |
| 2004/0023236 A1 | 2/2004 | Potter et al. | |
| 2004/0145271 A1 | 7/2004 | Potter | |
| 2004/0155555 A1 | 8/2004 | Potter | |
| 2005/0035683 A1 * | 2/2005 | Raisanen | 310/311 |
| 2005/0044955 A1 | 3/2005 | Potter | |
| 2005/0079640 A1 | 4/2005 | Potter | |
| 2005/0186117 A1 | 8/2005 | Uchiyama et al. | |
| 2005/0205966 A1 * | 9/2005 | Potter | 257/532 |

FOREIGN PATENT DOCUMENTS

| | | |
|---|---|---|
| JP | 62-297534 | 12/1987 |
| JP | 02-219478 A | 9/1990 |
| JP | 4-236172 | 8/1992 |
| JP | 08-308258 A | 11/1996 |
| JP | 2000-304567 A | 11/2000 |

OTHER PUBLICATIONS

"Surface Machined Micromechanical Membrane Pump", Judy, Tamagawa, and Polla, CH2957-9/91/0000-182, pp. 182-186, 1991 IEEE.*

"A Review of Micropumps" Laser and Santiago, J. Micromech. Microeng. 14 (2004), pp. R35-R64, Apr. 19, 2004, 2004 IOP Publishing Ltd.*

"Basic information in microfluidic system", Zheng Chi, cached copy on Oct. 15, 2001, found at http://web.archive.org/web/20011015071501/http://www.ccmicro.rl.ac.uk/info_microfludics.html, 14 pages.* http://www.ida.org/DIVISIONS/std/MEMS/tech_fluids.html, retrieved Jun. 13, 2002, 2 pages.

Aguilera et al., "Electron Energy Distribution at the Insulator-Semiconductor Interface in AC Thin Film Electroluminescent Display Devices," *IEEE Transactions on Electron Devices* 41(8):1357-1363 (1994).

Brown, et al., "A Varactor-Tuned RF Filter," *IEEE Trans. on MTT*, pp. 1-4 (1999).

Cass, S., "Large Jobs for Little Devices," *IEEE Spectrum*, pp. 72-73 (2001).

Ilic et al., "Mechanical Resonant Immunospecific Biological Detector," *Appl. Phys. Lett.* 77(3):450-452 (2000).

Ilic et al., "Single Cell Detection with Micromechanical Oscillators," *J. Vac. Sci. Technol. B* 19(6):2825-2828 (2001).

Kobayashi et al., "Distribution of Trapped Electrons at Interface State in ACTFEL Devices," in Proceedings of the Sixth International Workshop on Electroluminescence, El Paso, Texas, May 11-13 (1992).

http://ucsub.colorado.edu/~maz/research/background.html [Retrieved from Web site on Apr. 4, 2001].

"Low-Power, High-Performance MEMS-Based Switch Fabric," at http://www.ece.ncsu.edu/erl/damemi/switchproj.html [Retrieved from Web site on Apr. 4, 2001].

http://www.eecs.umich.edu/RADLAB/bio/rebeiz/Current_Research.html [Retrieved from Web site on Apr. 4, 2001].

* cited by examiner

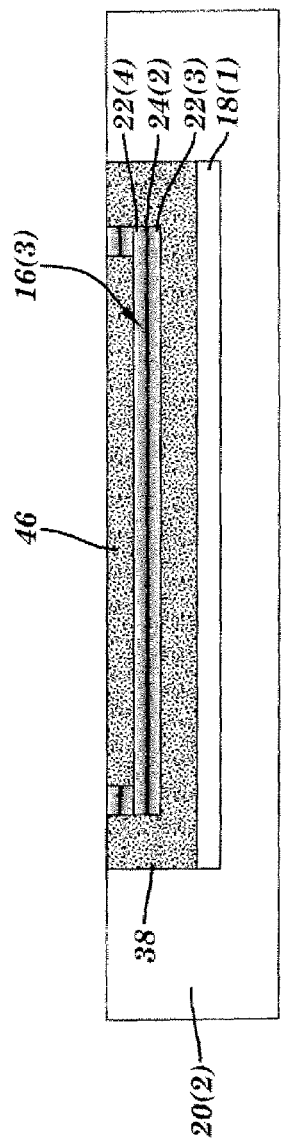
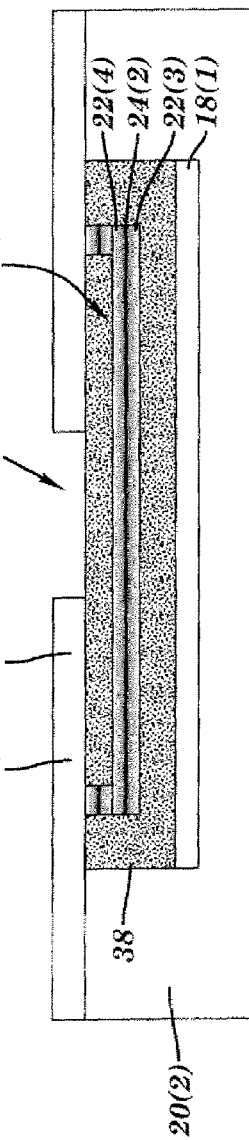
FIG. 8
FIG. 9

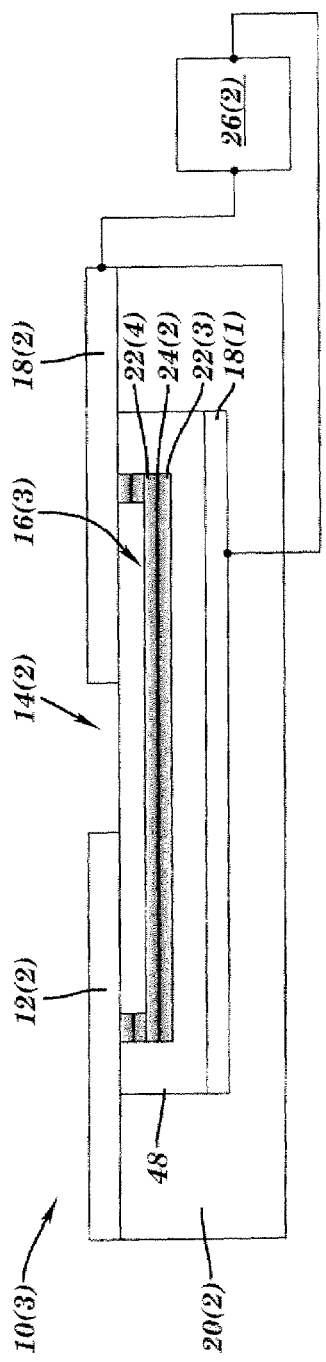
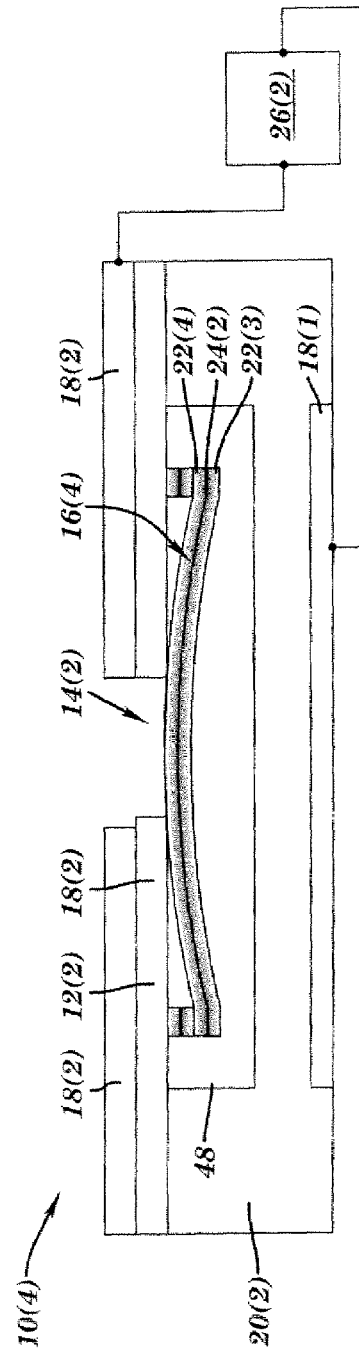

MICRO FLUIDIC VALVES, AGITATORS, AND PUMPS AND METHODS THEREOF

The present invention claims the benefit of U.S. Provisional Patent Application Ser. No. 60/294,912, filed May 31, 2001, which is hereby incorporated by reference in its entirety.

FIELD OF THE INVENTION

This invention relates to micro fluidic valves, agitators, and pumps and methods thereof.

BACKGROUND OF THE INVENTION

In micro fluidics it has been very difficult to create valves that seal well. In particular, existing designs for valves based on standard MEMS processes tend to be prone to leakage.

It has also been very difficult in micro fluidics to create valves with a reasonably simple actuator mechanisms. As a result, the valves are complicated to open and close as well as to manufacture.

Further, it has been difficult in micro fluidics to create agitators and high force pumps.

SUMMARY OF THE INVENTION

A valve in accordance with one embodiment of the present invention includes a structure with at least one opening and a member having a fixed static charge. The member has a first position exposing the opening and a second position sealing the opening.

A method for making a valve in accordance with another embodiment of the present invention includes providing a structure with at least one opening and providing a member having a fixed static charge. The member has a first position exposing the opening and a second position sealing the opening.

An agitator in accordance with another embodiment of the present invention includes a base with at least one trench, a structure with at least one opening, and a membrane with a fixed static charge. The structure is connected to the base over the trench with the opening in the structure extending through to the trench in the base. The membrane is connected to the base across at least a portion of the trench.

A method for agitating one or more substances in accordance with another embodiment of the present invention includes placing the one or more substances in a trench in a base through an opening in a structure. The structure is connected to the base over the trench. A varying bias is applied to at least two control electrodes which are adjacent to and spaced from different sides of a membrane with a fixed static charge. The membrane is connected to the base across at least a portion of the trench. The membrane moves towards and away from one of the control electrodes based on the applied varying bias.

A pump in accordance with another embodiment of the present invention includes a base with at least one trench, a structure with at least two openings, a membrane with a fixed static charge, a first cantilever arm having a fixed static charge, and a second cantilever arm having a fixed static charge. The structure is connected to the base over the trench with the openings in the structure extending through to the trench in the base. The membrane is connected to the base across at least a portion of the trench. The first cantilever arm has a first position exposing one of the openings and a second position sealing the one of the openings. The second cantilever arm has a first position exposing another one of the openings and a second position sealing the another one of the openings.

A method for pumping one or more substances in accordance with another embodiment of the present invention includes applying a first bias to a first control electrode and a fourth control electrode which are adjacent to and spaced from different sides of a membrane with a first fixed static charge. The membrane is connected to a base across at least a portion of a trench in the base. The membrane is moved towards and away from the first control electrode based on the applied first bias to pump the one or more substances into the trench in the base through the first opening in the structure. The structure is connected to the base over the trench. A second bias is applied to a second control electrode and the fourth control electrode which are adjacent to and spaced from different sides of a first cantilever arm with a second fixed static charge. The first cantilever arm moves towards the first opening in the structure to seal the first opening in response to the applied second bias. A third bias is applied to a third control electrode and the fourth control electrode which are adjacent to and spaced from different sides of a second cantilever arm with a third fixed static charge. The second cantilever arm moves away from the second opening in the structure to open the second opening in response to the applied third bias. A fourth bias is applied to the first control electrode and the fourth control electrode. The membrane moves toward the first electrode based on the applied fourth bias to pump the one or more substances out of the trench in the base through the second opening in the structure.

The present invention provides a micro fluidic valve which achieves a tight seal, has a wide opening for maximum flow, and has a simple, yet robust actuator system. Additionally, with the present invention a variety of different types of valves can be designed, such as the cantilever type valves and the membrane type valves. Both the cantilever type and the membrane type are well-suited for the control of gaseous materials.

BRIEF DESCRIPTION OF THE DRAWINGS

FIGS. 6–10 are cross-sectional, side views of a method of making a membrane type valve in accordance with another embodiment of the present invention;

FIG. 11 is a cross-sectional, side view of a membrane type valve in accordance with another embodiment of the present invention.

DETAILED DESCRIPTION

Micro fluidic devices 10(1)–10(4) in accordance with embodiments of the present invention are illustrated in FIGS. 4, 5, 10, and 11. Each of the micro fluidic devices 10(1)–10(4) include a valve seat or other structure 12(1) or 12(2) with an opening 14(1) or 14(2) and a member 16, such as a cantilever arm 16(1) or 16(2) or a membrane 16(3) or 16(4) having a fixed static charge. The member 16 has a first position exposing the opening 14(1) or 14(2) and a second position sealing the opening 14(1) or 14(2). The present invention provides micro fluidic valves which achieve a tight seal, have a wide opening for maximum flow, and have a simple, yet robust actuator system. The present invention also provides other micro fluidic devices, such as agitators and pumps.

Figure 3:
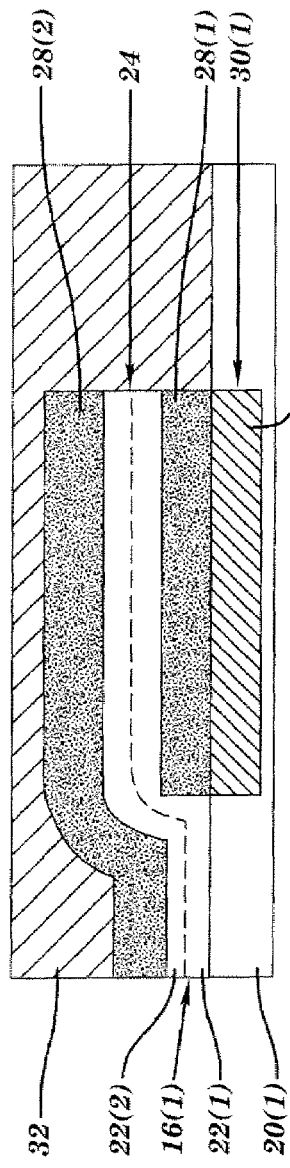
Figure 4:
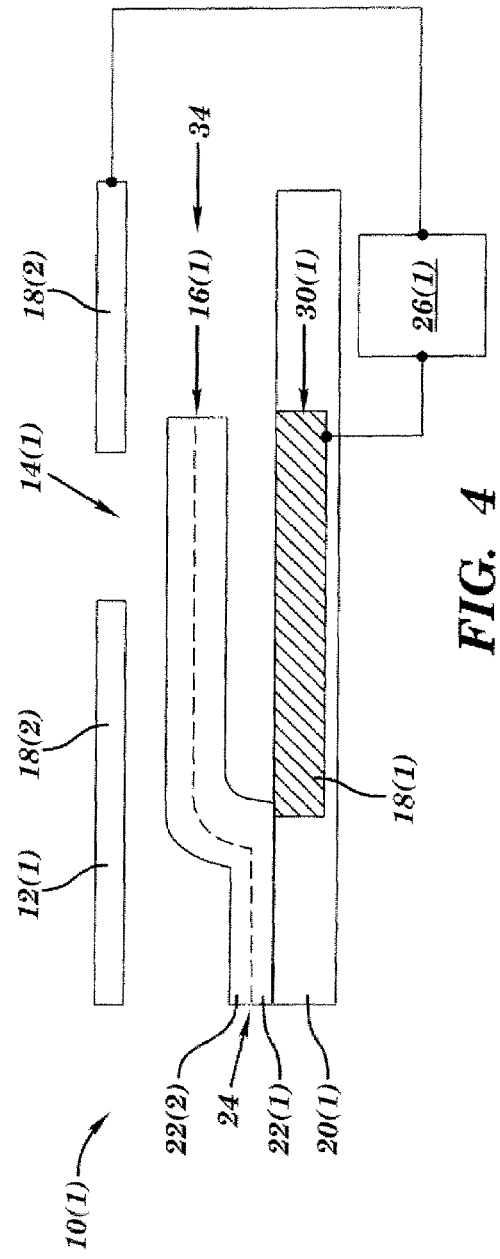
Figure 5:
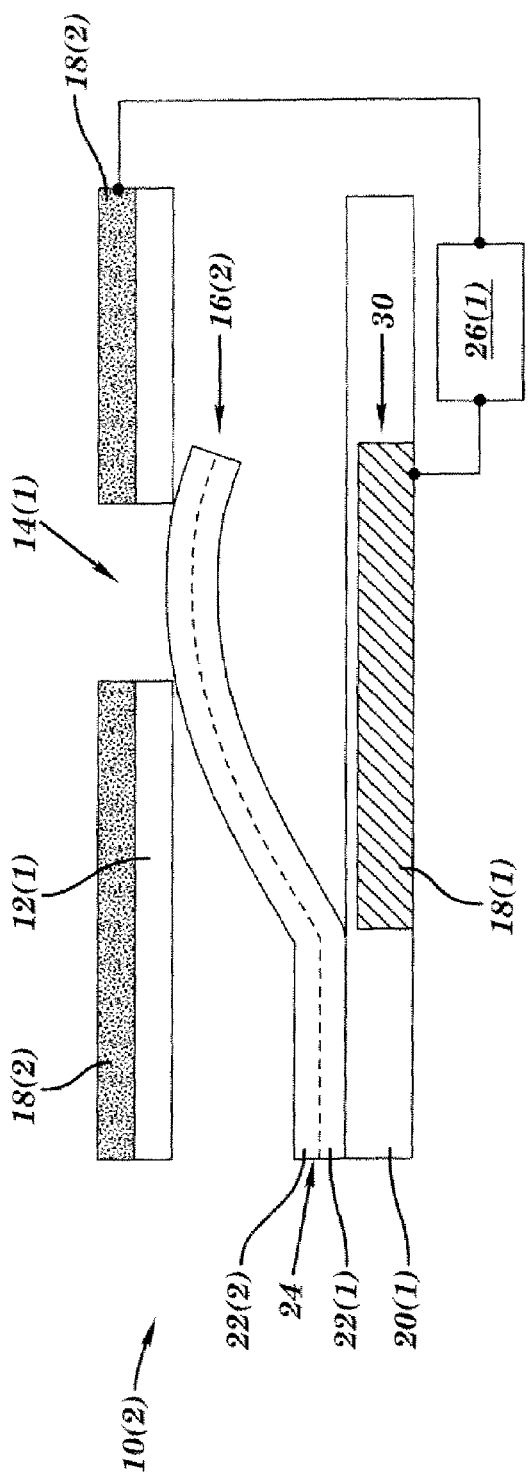
FIG. 5 is a cross-sectional, side view of a cantilever type valve in accordance with another embodiment of the present invention.

Referring more specifically to FIGS. 4 and 5, micro fluidic devices 10(1) and 10(2), such as valves or agitators, are illustrated. Elements in FIG. 5 which are identical to those described in FIGS. 1–4, will have like numerals. These like elements are identical except as described herein. Each of the device 10(1) and 10(2) includes a structure 12(1) with an opening 14(1). The number of openings and the size of each opening can vary as required by the particular application. The structure 12(1) is made of a conducting material, such as aluminum, which forms one of the control electrodes 18(2), although the structure 12(1) could be made of other materials. For example, if structure 12(1) is made of a insulating material, then another layer of conductive material could be formed in or on the structure 12(1) to form one of the control electrodes 18(2) as shown in FIG. 5.

Referring to FIG. 4, the cantilever arm 16(1) is connected at one end to a base 20(1) and has another end which is spaced from and is positioned to extend across the opening 14(1) in the structure 12(1) to form a normally open position for the device 10(1), although other configurations can be used. For example, the cantilever arm 16(2) could be seated across the opening 14(1) and against, but not connected to the structure 12(1) to form a normally closed valve 10(2) as shown in FIG. 5. Although each of the devices 10(1) and 10(2) has a cantilever arm 16(1) and 16(2), other types of members 16 which can hold a fixed static charge could also be used.

Referring to FIGS. 4 and 5, the cantilever arms 16(1) and 16(2) each comprise a layer 22(2) of insulating material deposited on a layer 22(1) of insulating material, such as $SiO_2$ and $Si_3N_4$, although other types of materials, other numbers of layers, and other types of members could be used, such as having three or more layers or using an electret for cantilever arms 16(1) and 16(2). Depositing layer 22(2) on layer 22(1) creates an interface 24(1) where the fixed static charge is held.

One of the control electrodes 18(1) is located in the base 20(1) and is spaced from the other end of the cantilever arm 16(1) or 16(2) and the structure 12(1) is the other control electrode 18(2) on an opposing side of the cantilever arm 16(1) or 16(2), although other numbers of control electrodes can be used and the control electrodes can be in other locations, such as spaced from cantilever arm 16(2) by a portion of base 20(1) as shown in FIG. 5. Control electrodes 18(1) and 18(2) are each made of a conductive material, such as aluminum, although other types of materials can be used.

A power source 26(1) is coupled to the control electrodes 18(1) and 18(2). Depending on the polarity of the bias applied to the control electrodes 18(1) and 18(2) by the power source 26(1) and the initial position of the cantilever arm 16(1) or 16(2), the cantilever arm 16(1) or 16(2) is either moved towards the opening 14(1) in the structure 12(1) to eventually seal the opening 14(1) or away from the opening 14(1) in the structure 12(1) to open the valve.

Referring to FIGS. 10 and 11, micro fluidic devices 10(3) and 10(4) are illustrated. Elements in FIG. 11 which are identical to those described in earlier embodiments in FIGS. 6–10, will have like numerals. These like elements are identical except as described herein. Each of the devices 10(3) and 10(4) also includes a valve seat or other structure 12(2) with an opening 14(2). Again, the number of openings and the size of each opening can vary as required by the particular application. The structure 12(2) is made of a conducting material, such as aluminum, which forms one of the control electrodes 18(2), although the structure 12(2) could be made of other materials. For example, if structure 12(2) is made of an insulating material, then another layer of conductive material could be formed in or on the structure 12(2) to form one of the control electrodes 18(2) as shown in FIG. 11.

The membranes 16(3) and 16(4) are connected at each end to the structure 12(2) across the opening 14(2), although the membranes 16(3) and 16(4) could be connected to other elements, such as a base 20(2). Referring to FIG. 10, an interior portion of the membrane 16(3) is spaced from the opening 14(2) in the structure 12(2) to form a normally open position for the valve 10(3), although other configurations can be used. For example, the membrane 16(4) could be seated against, but not connected to the structure 12(2) and across the opening 14(2) to form a normally closed valve 10(4) as shown in FIG. 11. Although a membrane 16(3) and 16(4) is shown in valves 10(3) and 10(4), other types of members 16 which can hold a fixed static charge could also be used.

Referring to FIGS. 10 and 11, the membranes 16(3) and 16(4) each comprise a layer 22(4) of insulating material on a layer 22(4) of insulating material, such as $SiO_2$ and $Si_3N_4$, although other types of materials, other numbers of layers, and other types of members could be used, such as having three or more layers or using an electret for membranes 16(3) and 16(4). Depositing layer 22(4) on layer 22(3) creates an interface 24(2) where the fixed static charge is held.

One of the control electrodes 18(1) is located in the base 20(2) and is spaced from the other end of the membrane 16(3) or 16(4) and the structure 12(2) is the other control electrode 18(2) on an opposing side of the membrane 16(3) or 16(4), although other numbers of control electrodes can be used and the control electrodes can be in other locations, such as spaced from membrane 16(4) by a portion of base 20(2) as shown in FIG. 11. Control electrodes 18(1) and 18(2) are each made of a conductive material, such as aluminum, although other types of materials can be used.

A power source 26(2) is coupled to the control electrodes 18(1) and 18(2). Depending on the polarity of the bias applied to the control electrodes 18(1) and 18(2) by the power source 26(2) and the initial position of the membrane 16(3) or 16(4), the membrane 16(3) or 16(4) is either moved towards the opening 14(2) in the structure 12(2) or away from the opening 14(2) in the structure 12(2) to open the valve. The membranes 16(3) and 16(4) can be moved to seal the opening 14(2) in the structure 12(2).

Referring to FIGS. 4, 5, 10, and 11, the layer or layers 22(1)–22(2) and 22(3)–22(4) with stored fixed charge at the interface 24(1) and 24(2) which form the cantilever arms 16(1) and 16(2) and membranes 16(3) and 16(4) described in the embodiments above include dual dielectric thin films. These layers 22(1)–22(2) and 22(3)–22(4) with stored fixed charge have an electron trap density that is optimized for a high density of states with energy levels sufficiently below the conduction band minimum for extremely long trapped charge retention times. By way of example only, electron charge injection into these layer or layers 22(1)–22(2) and 22(3)–22(4) which form the cantilever arms 16(1) and 16(2) and membranes 16(3) and 16(4) can be accomplished by applying a sufficient electrical bias across the layer or layers 22(1)–22(2) and 22(3)–22(4) by utilizing conducting electrodes or conducting sacrificial layers 28(1) and 28(2) as shown in FIG. 3. In another example, charge injection into the layer or layers 22(1)–22(2) and 22(3)–22(4) can be accomplished with a medium energy electron gun.

One example of such a structure with stored fixed charge has a first layer 22(1) or 22(3) of silicon dioxide and a second layer 22(2) or 22(4) of silicon nitride. The band gaps are approximately 9.0 eV and approximately 5.0 eV respectively. Under bias, electrons tunnel into the conduction band of the silicon dioxide and drift toward the silicon nitride due to a high field. Although the band gap of silicon dioxide is very wide, the electron mobility is on the order of 1–10 cm² per volt-second. However, when the electrons arrive at the dual insulator interface 24(1) or 24(2) they encounter interface states with energy levels approximately 1.0 eV below the conduction band of the silicon nitride. These trap states are quickly filled. The permittivity of the silicon nitride is approximately twice that of silicon oxide. Therefore, there is less band bending in the silicon nitride and trapped electrons do not have sufficient energy to tunnel into the silicon nitride conduction band, i.e., the traps are filled and remain filled. Once the electrical bias is removed, reverse tunneling is possible as long as the stored charge is sufficient to cause a band bending great enough for emptying a trap to the silicon dioxide conduction band. Taking into account filled trap densities, permittivities, and each component film thickness, a high level of trapped static charge is achievable in this particular example.

Figure 1:
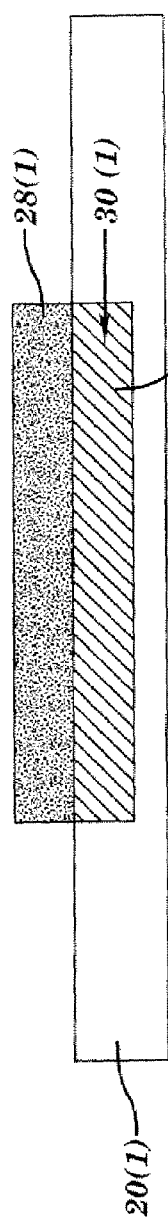
FIGS. 1–4 are cross-sectional, side views of a method of making a cantilever type valve in accordance with one embodiment of the present invention.

A method for making a device 10(1) in accordance with one embodiment will be described with reference to FIGS. 1–4. Referring more specifically to FIG. 1, a channel 30 or other opening is etched in to the base 20(1) or other substrate. Next, a layer of conductive material, such as aluminum, is deposited in the channel 30(1) to form the control electrode 18(1), although other types of materials can be used. The layer of conductive material in the channel 30(1) may be planarized.

Next, a first sacrificial layer 28(1) of conductive material, such as a polysilicon, is deposited on the base 20(1) and the control electrode 18(1), although other types of materials can be used, such as insulating materials. The first sacrificial layer 28(1) is patterned over an area over the control electrode 18(1) and the portion of the first sacrificial layer 28(1) which is not covered by the pattern is removed.

Figure 2:
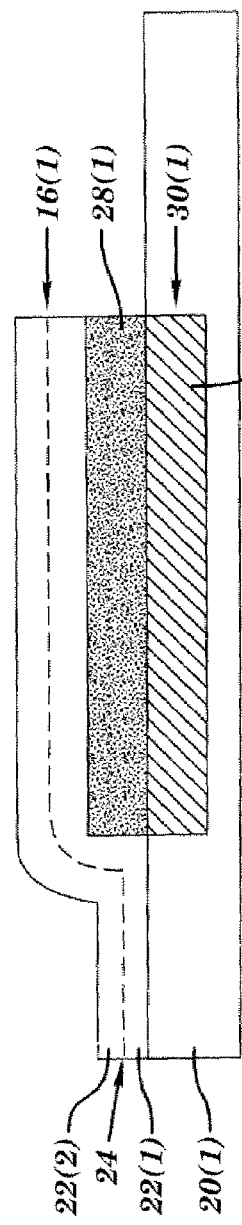

Referring to FIG. 2, a first layer 22(1) of insulating material, such as SiO₂, is deposited on the base 20(1) and the first sacrificial layer 28(1), although other types of materials could be used. Next, a second layer 22(2) of insulating material, such as Si₃N₄, is deposited on the first layer 22(1) of insulating material, although other types of materials can be used. An interface 24(1) is formed between the first and second layers 22(1) and 22(2) of insulating material and the fixed static charge is held at the interface 24(1). The first and second insulating layers 22(1) and 22(2) form the cantilever arm 16(1) or 16(2), although each of the cantilever arms 16(1) and 16(2) can be comprised of other numbers of layers with the stored fixed static charge held at one or more of the interfaces between these multiple layers. Additionally, other types of members 16 that can hold a fixed static charge could be used in place of the cantilever arms 16(1) and 16(2).

Referring to FIG. 3, a second sacrificial layer 28(2) of conductive material, such as poly silicon, is deposited on the second layer 22(2) of insulating material for the cantilever arm 16(1). Next, the first and second sacrificial layers 28(1) and 28(2) which act as electrodes are coupled to a power source (not shown) and are used to inject electrostatic charge into the interface 24(1) between the first and second layers 22(1) and 22(2) of insulating materials, although other techniques for imbedding the fixed state static charge can be used. For example, the fixed state static charge may be injected by an electron gun before the deposition of a second sacrificial layer 28(2). In that case, the second sacrificial layer 28(2) can totally fill the chamber region and be planarized for subsequent processing and the first and second sacrificial layers 28(1) and 28(2) do not need to be made of a conductive material.

Once the fixed state static charge is imbedded into the interface 24(1), a third sacrificial layer 32 of insulating material, such as poly silicon, is deposited on the second sacrificial layer 28(2) and the base 20(1), although other types of materials can be used. Next, the third sacrificial layer 32 is planarized, although if the structure is near planar, this step may not be required.

Referring to FIG. 4, a layer of conducing material, such as aluminum, is deposited on the third sacrificial layer 32 to form a structure 12(1) which also acts as the control electrode 18(2), although other types of materials could be used to form the structure 12(1), such as an insulating material, if the control electrode 18(2) is located elsewhere, such as in or on structure 12(1) as shown in FIG. 5. Next, an opening 14(2) is patterned in the layer which forms structure 12(1), although other numbers of openings could be patterned and formed. The portion of the layer which forms structure 12(1) not covered by the pattern where the opening 14(1) is located is removed to form an opening 14(1) which extends through the layer forming the structure 12(1). The opening 14(1) is patterned in a location in the layer which forms structure 12(1) where one end of the cantilever arm 16(1) extends across the opening 14(1). Next, the first, second and third sacrificial layers 28(1), 28(2) and 32 are removed through the structure 12(1) opening 14(1) to form a chamber 34 or passage.

The method for making the device 10(2) shown in FIG. 5 is the same as the method described above for making the device shown in FIG. 4, except that the cantilever arm 16(2) is fabricated to be in a normally closed position, instead of the normally open position shown in FIG. 4, control electrode 18(1) is spaced from cantilever arm 16(2) by a portion of the base 20(1), and a control electrode 18(1) is formed on the structure 18(1).

The operation of the devices 10(1) and 10(2) will now be discussed with reference to FIGS. 4 and 5. When a suitable bias with a first polarity is applied to the control electrodes 18(1) and 18(2) by a power source 26(1), the cantilever arm 16(1) in FIG. 4 can be made to move from its normally open position spaced from the opening 14(1) in the structure 12(1) to a closed or sealed position against the structure 12(1) to seal the opening 14(1). When the bias is removed or is reversed to a second polarity, then the cantilever arm 16(1) returns to its normally open position spaced from the opening 14(1) in the structure 12(1). If, as shown in FIG. 5, the cantilever arm 16(2) is fabricated to be in the normally closed position sealing the opening 14(1) in the valve 10(2), then when a suitable basis of a first polarity is applied to control electrodes 18(1) and 18(2) the cantilever arm 16(2) is moved away from the structure 12(1) to open the opening 14(1). When the bias is removed or is reversed to a second polarity, then the cantilever arm 16(2) returns to its normally closed position sealing the opening 14(1) in the structure 12(1).

Figure 6:
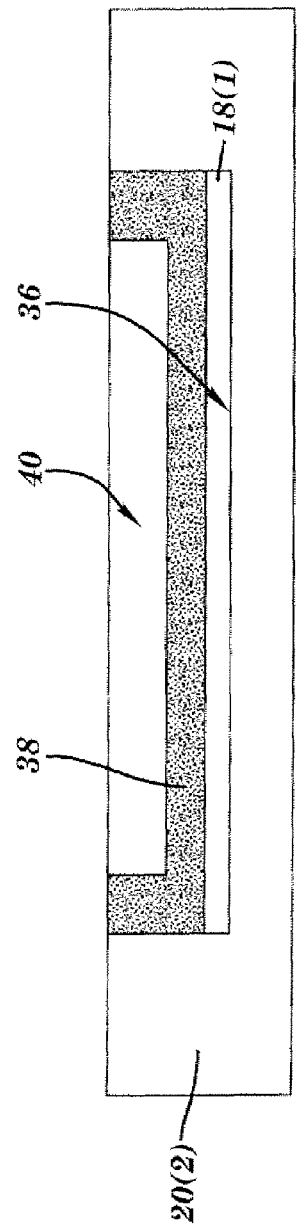

A method for making a device 10(3) in accordance with another embodiment will be described with reference to FIGS. 6–10. Referring more specifically to FIG. 6, a portion of the base is etched to form a channel 36, although other techniques for forming the channel 36 could be used. A layer of conductive material is deposited in the channel 36 to from the control electrode 18(1), although control electrode 18(1) can be located and formed in other locations. By way of example only, in FIG. 11 control electrode 18(1) is spaced from the membrane 16(4) by a portion of base 20(2). Referring back to FIG. 6, a layer 38 of sacrificial material, such as poly silicon, is deposited in the channel 36 on the control electrode 18(1) and a portion of the layer of sacrificial material 38 is removed to form another channel 40 in this layer 38 of sacrificial material.

Figure 7:
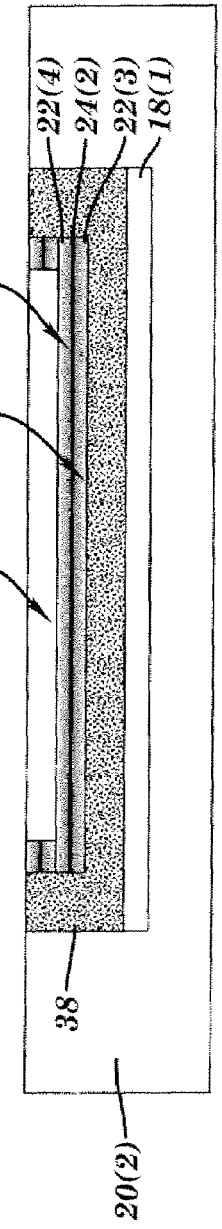

Referring to FIG. 7, a first layer 22(3) of insulating material, such as $SiO_2$, is deposited in the channel 40 in the layer 38 of sacrificial material, although other types of materials could be used. Next, a second layer 22(4) of insulating material, such as poly silicon, is deposited in the channel 42 in the first layer 22(3) of insulating material, although other types of materials could be used. A portion of the second layer 22(4) of insulating materials is removed to form another channel 44. The first and second layers 22(3) and 22(4) of insulating materials form a membrane 16(3) which can hold a fixed state static charge at an interface 24(2), although other numbers of layers could be used.

Next, the fixed state static charge is imbedded into the interface 24(2) between the first and second layers 22(3) and 22(4) of insulating material by applying a bias across the first and second layers of insulating materials, although other techniques for imbedding the fixed state static charge, such as using an electron flood gun, could be used.

Referring to FIG. 8, a sacrificial layer 46, such as poly silicon, is deposited in the channel 44 in the second layer 22(4) of insulating material, although other types of materials could be used. Next, the sacrificial layer 46 is planarized, although if the structure is near planar, this step may not be required.

Referring to FIG. 9, a layer of conductive material, such as aluminum, is deposited on the sacrificial layer to form a structure 12(2) and control electrode 18(2), although other types of materials could be used to form the structure 12(2), such as an insulating material if a control electrode 18(2) was located somewhere else, such as on structure 18(2) as shown in FIG. 11. Next, an opening 14(2) is patterned in the layer which forms structure 12(2), although other numbers of opening 14(2) could be patterned and formed. The portion of the layer which forms structure 12(2) not covered by the pattern where the opening 14(2) is located is removed to form an opening 14(2) which extends through the layer forming the structure 12(2). The opening 14(2) is patterned in a location in the layer which forms structure 12(2) where an interior portion of the membrane extends across the opening 14(2). Next, the sacrificial layer 46 is removed through the opening 14(2) and the sacrificial layer 38 is removed through another opening which is not shown and which is sealed after the sacrificial layer 38 is removed to form a chamber 48 or passage.

The method for making the device 10(4) shown in FIG. 11 is the same as the method described above for making the device 10(3) shown in FIG. 10, except that the membrane 16(4) is fabricated to be in a normally closed position, instead of the normally open position shown in FIG. 10, the control electrode 18(1) is also spaced from the membrane by a portion of the base 20(2), and the control electrode 18(2) is on the structure 12(2).

The operation of these devices 10(3) and 10(4) will now be discussed with reference to FIGS. 10 and 11. When a suitable bias and polarity is applied to the control electrodes 18(1) and 18(2) by a power source 26(2), the membrane in FIG. 10 can be made to move from its normally open position spaced from the opening 14(2) in the structure 12(2) to a closed or sealed position resting against the structure 12(2) to seal the opening 14(2). When the bias from the power source 26(2) is removed or the polarity of the bias is reversed, then the membrane 16(3) returns to its normally open position spaced from the opening 14(2) in the structure 12(2). If, as shown in FIG. 11, the membrane 16(4) is fabricated to be in the normally closed position sealing the opening 14(2) in the device 10(4), then when a suitable basis and polarity from the power source 26(2) is applied the membrane 16(4) is moved away from the structure 12(2) to open the opening 14(2). When the bias from the power source 26(2) is removed or the polarity of the bias is reversed, then the membrane 16(4) returns to its normally closed position sealing the opening 14(2) in the structure 12(2).

An alternative operation of the devices 10(3) and 10(4) will be discussed with reference to FIGS. 10 and 11. For many biological and micro-chemical micro fluidic systems, the mixing of two or more substances can be facilitated by agitation. In this particular embodiment, the devices 10(3) and 10(4) each can be used as an agitator. In this particular embodiment, a bias from the power source 26(2) with varying amplitude and/or polarity is applied to the control electrodes 18(1) and 18(2). The varying bias will cause the membrane 16(3) or 16(4) to move toward and away from the control electrodes 18(1) and 18(2). This motion of the membrane 16(3) or 16(4) provides agitation to mix one or more substances. Applying a varying bias to the control electrodes 18(1) and 18(2) for cantilever arms 16(1) and 16(2) in the devices 10(1) and 10(2) shown in FIGS. 4 and 5 will also provide agitation.

Figure 12:
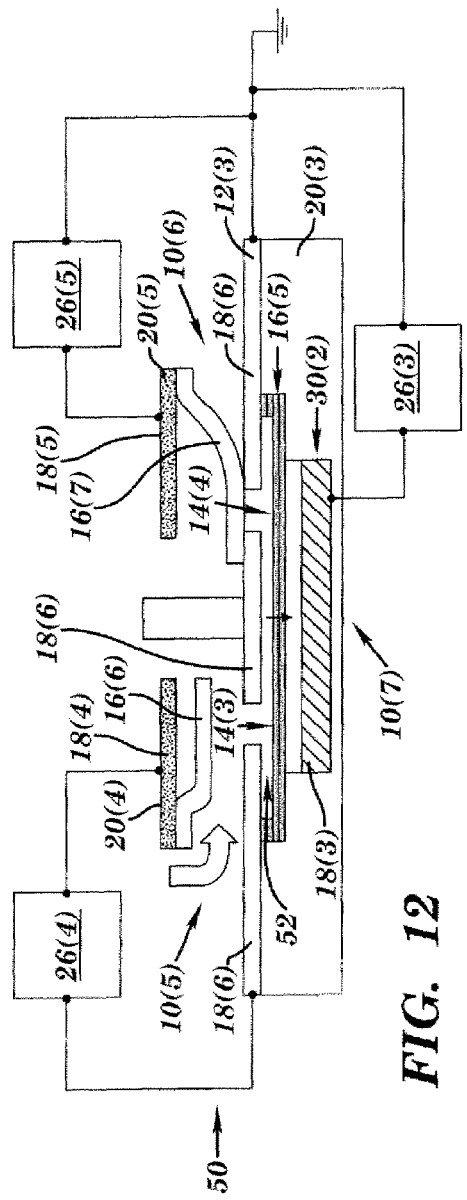
FIGS. 12 and 13 are cross sectional side views of a pumping system in operation in accordance with another embodiment of the present invention.
Figure 13:
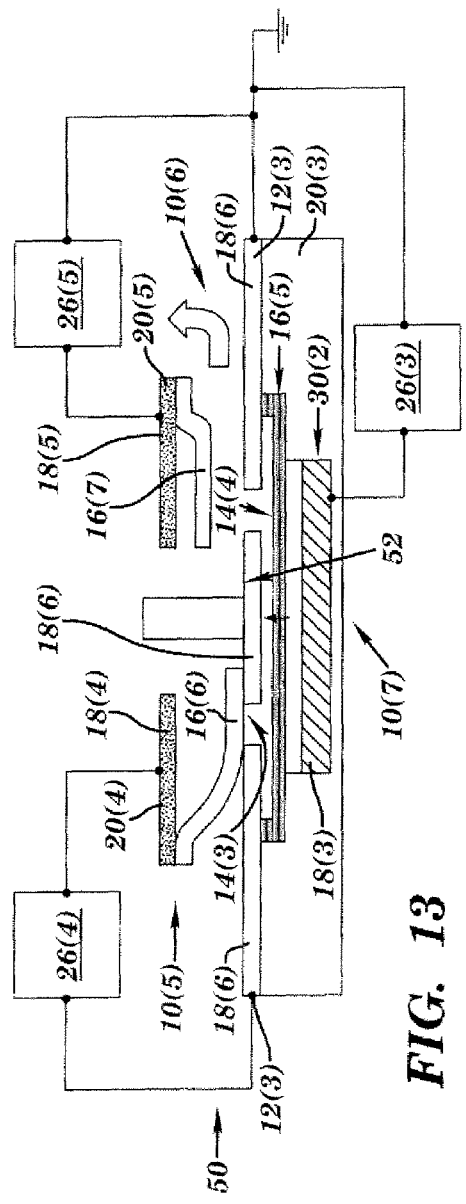

Referring to FIGS. 12 and 13, a pump 50 in accordance with another embodiment of the present invention is illustrated. Elements in FIGS. 12 and 13 which are identical to those described in earlier embodiments in FIGS. 1–11, will have like numerals. These like elements are identical except as described herein.

In this particular embodiment, the pump 50 includes a pair of cantilever type devices 10(5) and 10(6) and a membrane type device 10(7), although other types of valves can be used in pump 50. Since the cantilever type devices 10(5) and 10(6) are identical to the device 10(1) and the membrane type device 10(7) is identical to the device 10(3), except as described herein, these devices 10(5)–10(7) will not be described again in detail here.

The pump 50 includes a substrate 20(3) with a channel 30(2). A control electrode 18(3) is buried in the substrate 20(3) at the base of the channel 30(2). A structure 12(3) which acts as a control electrode 18(6) is seated over the channel 30(2) in the substrate 20(3) and has a pair of openings 14(3) and 14(4) that extend through to the channel 30(2) in the substrate 20(3). A membrane 16(5) extends across the channel 30(2) in the substrate 20(3) and is spaced from the openings 14(3) and 14(4) in the structure 12(3) and also from the control electrode 18(3) at the base of the channel 30(2). The membrane 16(5) acts as the diaphragm of the pump 50 in this particular embodiment.

A cantilever arm 16(6) for one device 10(5) has an end which extends across and is normally seated against to seal one of the openings 14(3) in the structure 12(3), although other configurations are possible, such as having the cantilever arm 16(6) being normally open. The other end of the cantilever arm 16(6) is connected to another substrate 20(4).

A control electrode 18(4) is in the substrate 20(4) adjacent one free end of the cantilever arm 16(6).

A cantilever arm 16(7) for another device 10(6) has an end which extends across and is normally seated against the other opening 14(4) in the structure 12(3), although other configurations are possible, such as having the cantilever arm 16(7) being normally open. The other end of the cantilever arm 16(7) is connected to another substrate 20(5). A control electrode 18(5) is in the substrate 20(3) adjacent the cantilever arm 16(7).

A power source 26(3) is coupled to the control electrodes 18(3) and 18(6), a power source 26(4) is coupled to the control electrodes 18(4) and 18(6), and a power source 26(5) is coupled to the control electrodes 18(5) and 18(6), although other configurations are possible, such as having a single power source controlling the devices 10(5)–10(7) in pump 50.

The operation of the pump 50 will be described with reference to FIGS. 12 and 13. In this particular embodiment, a first bias is applied by the power source 26(4) to the control electrodes 18(4) and 18(6) adjacent the cantilever arm 16(6). The cantilever arm 16(6) is moved away from the first opening 14(3) in a structure 12(3) in response to the applied first bias. If the cantilever arm 16(3) has a different starting position, such as a normally open position spaced from the first opening 14(3) in the structure 12(3), then this step may be unnecessary.

A second bias is applied by the power source 26(5) to the control electrodes 18(5) and 18(6) adjacent the cantilever arm 16(7). The cantilever arm 16(7) is held against the second opening 14(4) in the structure 12(3) to seal the second opening 14(4) in response to the applied second bias. If the cantilever arm 16(7) has a different starting position, such as a normally closed position sealing the second opening 14(4) in the structure 12(3), then this step may be unnecessary.

A third bias is applied by the power source 26(3) to the control electrodes 18(3) and 18(6) which is adjacent to the membrane 16(5). The membrane 16(5) moves away from the first and second openings 14(3) and 14(4) in the structure 12(3) based on the applied third bias. One or more substances are pumped into a trench 52 in the base 20(3) through the first opening 14(3) in the structure 12(3) in response to the movement of the membrane 16(5).

A fourth bias is applied by the power source 26(4) to the first control electrodes 18(4) and 18(6) adjacent the cantilever arm 16(6). The cantilever arm 16(6) moves towards the first opening 14(3) in the structure 12(3) to seal the first opening 14(3) in response to the fourth bias.

A fifth bias applied by the power source 26(5) to the control electrodes 18(5) and 18(6) adjacent the cantilever arm 16(7). The cantilever arm 16(7) moves away from the second opening 14(4) in the structure 12(3) to open the second opening 14(4) in response to the fifth bias.

A sixth bias is applied by the power source 26(3) to the control electrodes 18(3) and 18(6). The membrane 16(5) moves toward the first and second openings 14(3) and 14(4) to pump the one or more substances out of the trench 52 in the base 20(3) through the second opening 14(4) in the structure 12(3). Accordingly, the present invention provides a simple and effective micro fluidic pump.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A device comprising:
   a structure with at least one opening;
   a non-conducting member comprising two or more insulators deposited on each other with an interface between each pair of the insulators, the member having a first position exposing the opening and a second position sealing the opening;
   a trapped, fixed static charge is imbedded at at least one of the interfaces between the two or more insulators after one of the two or more insulators is deposited on the other of the two or more insulators; and
   at least two control electrodes which are adjacent to and spaced from different sides of the non-conducting member, the at least two control electrodes control the movement of the non-conducting member between the first position and the second position in response to an applied bias.

2. The device as set forth in claim 1 wherein at least a portion of the structure adjacent the opening comprises one of the control electrodes.

3. The device as set forth in claim 1 wherein the member comprises a cantilever arm.

4. The device as set forth in claim 3 wherein the cantilever arm comprises an electret with the fixed static charge.

5. The device as set forth in claim 3 wherein a free end of the cantilever arm is located adjacent to and spaced from the opening in the structure.

6. The device as set forth in claim 3 wherein a free end of the cantilever arm is located against the opening in the structure.

7. The device as set forth in claim 1 wherein the two or more insulators deposited on each other are made of dissimilar materials.

8. The device as set forth in claim 1 wherein the member comprises a membrane with an outer perimeter, at least a portion of the outer perimeter of the membrane is connected to the structure about the opening.

9. The device as set forth in claim 8 wherein the membrane comprises an electret with the fixed static charge.

10. The device as set forth in claim 8 wherein an interior portion of the membrane is located adjacent to and spaced from the opening in the structure to define a chamber.

11. The device as set forth in claim 8 wherein an interior portion of the membrane is located against the opening in the structure.

12. The device as set forth in claim 1 wherein the non-conducting member consists of the trapped, fixed static charge only at the interfaces between the two or more insulators.

13. A device comprising:
   a structure with at least one opening;
   two or more dissimilar insulators deposited on each other with an interface between each pair of the insulators, the member having a first position exposing the opening and a second position sealing the opening;
   a charge is imbedded and trapped at at least one of the interfaces between the two or more insulators after one of the two or more dissimilar insulators is deposited on the another one of the two or more dissimilar insulators; and at least two control electrodes which are adjacent to and spaced from different sides of the member, the at least two control electrodes control the movement of the non-conducting member between the first position and the second position in response to an applied bias.

14. The device as set forth in claim 13 wherein the member comprises a cantilever arm.

15. The device as set forth in claim 14 wherein a free end of the cantilever arm is located against the opening in the structure.

16. The device as set forth in claim 14 wherein the member comprises a membrane with an outer perimeter, at least a portion of the outer perimeter of the membrane is connected to the structure about the opening.

17. The device as set forth in claim 16 wherein the membrane comprises an electret with the fixed static charge.

18. The device as set forth in claim 16 wherein an interior portion of the membrane is located adjacent to and spaced from the opening in the structure to define a chamber.

19. The device as set forth in claim 16 wherein an interior portion of the membrane is located against the opening in the structure.

20. The device as set forth in claim 13 wherein a free end of the cantilever arm is located adjacent to and spaced from the opening in the structure.

21. The device as set forth in claim 13 wherein the non-conducting member consists of the trapped, fixed static charge only at the interfaces between the two or more insulators.

* * * * *